UNITED STATES PATENT OFFICE 2,221,831

ANTIMONYL CATECHOL SALICYLIC ACID SODIUM SALT

Harold P. Brown and James A. Austin, Kansas City, Mo., assignors to Jensen-Salsbery Laboratories Inc., Kansas City, Mo., a corporation of Missouri No Drawing. Application April 7, 1939, Serial No. 266,649

1 Claim. (Cl. 260—446)

This invention relates to an organic compound containing trivalent antimony linked through oxygen to phenyl radicals, which has therapeutic value.

Antimony has been widely used as a therapeutic agent but is almost invariably administered in the form of some chemical compound which carries it. The other elements included in the compound and the nature of the parts they play in the compound often profoundly modify the effect of the antimony when administered medically, and also limit the methods of administering it and the symptoms for which it is useful.

Trivalent organic antimony compounds containing linkages of antimony through oxygen to carbon have been described in which:

(1) The antimony has been linked through oxygen atoms to three carbon atoms all of which were contained in the same molecule, (2) The antimony is linked through oxygen atoms to three carbon atoms located in three different molecules, (3) The antimony is linked through oxygen atoms to two carbon atoms and through oxygen to a third carbon atom in another molecule which contains either one or more hydroxyl groups or a migratory hydrogen atom on carbon atoms adjacent to the linkage.

(4) The antimony is linked through an oxygen atom to carbon atoms located in two different radicals derived from identical parent molecules.

According to the present invention organic antimonyl compounds may be prepared in which the antimony atom is linked through two oxygen atoms to two carbon atoms located in one organic molecule and through a third oxygen atom to a carbon atom in a different organic molecule in which the carbons immediately adjacent to the linkage are unconnected to any hydroxyl group or easily migratory hydrogen atoms. Either, neither or both of the organic radicals to which the antimony is linked through oxygen may carry substituent groups which may or may not be solubilizing groups such as —COOH, —SO₃H, —OH or similar groups.

Several forms of the invention may be briefly indicated by the graphic formula

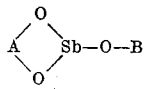

where A is an aliphatic, aromatic or heterocyclic radical having two active valences available and B is a monovalent radical selected from aliphatic, aromatic or heterocyclic radicals. It is also possible for B to be a polyvalent radical and form compounds of the type

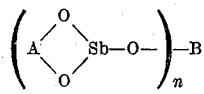

in which $n$ has an integral value of more than one. Either, neither or both radicals A and B may carry groups which may or may not be solubilizing groups.

Many compounds covered by this general formula are easily soluble in the appropriate solvents. Those containing —OH, —COOH and —SO₃H groups, for example, which are known as solubilizing groups, are soluble in aqueous solutions containing alkali metal, alkaline earth metal or similar metal hydroxides, carbonates or bicarbonates. Other compounds are soluble in the usual organic solvents.

According to the present invention organic compounds are prepared which carry antimony linked through an oxygen atom to a carbon atom and which may carry a solubilizing group or groups in either, neither or both of the two organic radicals of which the linked carbon atoms are a part.

In preparing a number of these new organic compounds it has been found advantageous to use fluorine compounds either as reagents or as intermediates because it has now been found that fluorine compounds react easily and form products of constant composition and a satisfactory degree of purity.

Other features and advantages will hereinafter appear.

*Example 1*

Antimonyl-catechol is prepared by a modification of the method of Causse (Bull. Soc. Chim. (3), 8, 245 (1892). 0.05 mol of the antimonyl-catechol is added to a solution of 0.05 mol of salicylic acid in 50 ml. of water containing sufficient sodium carbonate to yield a solution slightly alkaline to litmus paper. Addition is made in small portions while heating near boiling and with rapid stirring. The solution is kept just alkaline to litmus paper by additions of sodium bicarbonate or sodium carbonate solution. After heating for one hour it is filtered while hot and the filtrate concentrated until crystals start to form. Allowed to stand until thoroughly cooled and then filtered the product contains approximately 31.3% antimony which corresponds to antimonyl-catechol-salicylic acid-sodium salt having the formula:

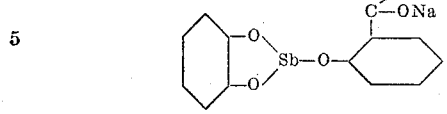

When meta-hydroxy-benzoic acid is substituted for salicylic acid in the preceding procedure a product is obtained containing approximately 31.3% antimony which corresponds to antimonyl-catechol-meta-hydroxy-benzoic acid-sodium salt having the formula:

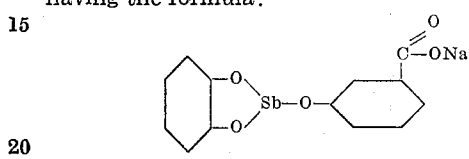

When para-hydroxy-benzoic acid is substituted for salicylic acid in the preceding procedure a product is obtained containing approximately 31.3% antimony which corresponds to antimonyl-catechol-para-hydroxy-benzoic acid-sodium salt, having the formula:

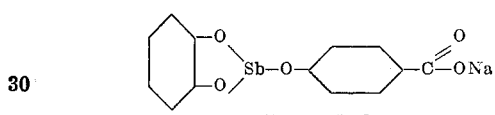

*Example 2*

Antimonyl catechol (0.05 mol) is added to a solution of 0.05 mol of 1,8-dihydroxy-3,6-naphthalene-disulfonic acid in 200 ml. of water containing sufficient sodium carbonate to yield a solution slightly alkaline to litmus paper. Addition is made in small portions with heating near boiling and rapid stirring. The solution is kept just alkaline to litmus paper by the addition of sodium carbonate or sodium bicarbonate. After heating for one hour the solution is filtered and the filtrate concentrated until crystallization starts. Allowed to stand until thoroughly cool and then filtered, the product obtained contains approximately 20.5% antimony which corresponds to antimonyl-catechol-1,8-dihydroxy-3,6-naphthalene-disulfonic acid-disodium salt having the formula:

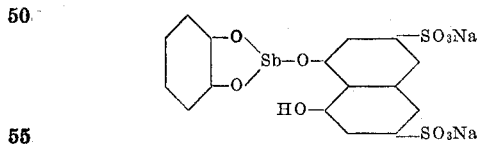

*Example 3*

If in the procedure of Example 2, 0.1 mol of antimonyl-catechol and 0.05 mol. of 1,8-dydroxy-3,6-naphthalene-disulfonic acid is employed, a product is obtained containing approximately 29.6% antimony which corresponds to bis-(antimonyl-catechol)-1,8-hydroxy-3,6-naphthalene-naphthalene-disulfonic acid-disodium salt and having the formula:

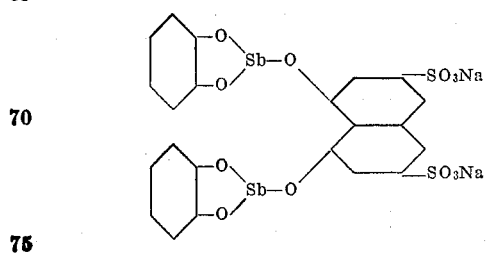

*Example 4*

It is possible to prepare products containing antimony linked to a heterocyclic ring by substituting a heterocyclic compound for the hydroxy-benzene-sulfonic acid in Example 3. For example antimonyl-3,4-dihydroxy-pyridine and antimonyl-4-methyl-esculetin react with such compounds as the three hydroxy benzoic acids, 2,4-dihydroxy-nicotinic acid and 2-hydroxy-nicotinic acid. Also antimonyl-catechol reacts with the two last named acids and other substances of similar structure to form organic antimonyl compounds in which antimony is linked through oxygen to a heterocyclic ring.

*Example 5*

0.05 mol of antimonyl-gallate prepared by the method of Christiansen, (J. Am. Chem. Soc., 48, 1367, (1926)) is added in small portions to a solution of 0.05 mol of salicylic acid in 50 ml. of water containing sufficient sodium carbonate to yield a solution slightly alkaline to litmus paper. Addition is made in small portions with heating near boiling and rapid stirring. The solution is kept just alkaline to litmus paper by addition of sodium carbonate or bicarbonate solution. After heating for one hour it is filtered while hot and the filtrate concentrated until crystallization starts. It is allowed to stand until thoroughly cool and then filtered. The product obtained contains approximately 26.8% antimony which corresponds to antimonyl-gallate-salicylic acid-disodium salt having the formula:

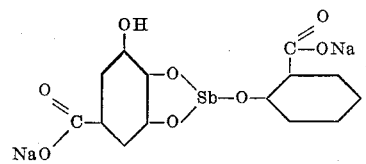

*Example 6*

Antimonyl-comenaminic acid may be substituted in the procedure of Example 5 for the antimonyl-gallate, and, in an analogous manner, reacts with salicylic acid to yield an organic antimony compound, antimonyl-comenaminate-salicylic acid-disodium salt, a compound in which a carbon atom of the heterocyclic ring is linked to an antimony atom through oxygen.

Antimonyl-comenaminate also reacts with meconic acid, 2-hydroxy-nicotinic acid and similar structures to give compounds in which either or both of the rings are from the heterocyclic group. Likewise antimonyl-gallate reacts in the same manner with 2-hydroxy-nicotinic acid as well as meconic acid to give complex antimonyl compounds in which the single linkage is to a carbon atom of a heterocyclic ring.

*Example 7*

Comenaminic acid is prepared according to the method of H. Meyer (Monatsh. 26, 1324–5 (1905)) from meconic acid. 0.03 mol of comenaminic acid is dissolved in 100 ml. of water containing sufficient sodium carbonate to render the solution neutral to litmus paper. A solution of 0.03 mol of antimony trifluoride in 30 ml. of water is added. Sufficient sodium carbonate solution is added to keep the solution faintly alkaline to litmus paper. If precipitation does not occur soon after mixing, the solution is concentrated until crystallization starts. It is allowed to stand 24 hours and then filtered. The fluorine-free product obtained contains approximately 31.7% antimony which corresponds to bis-(antimonyl-comenaminate)-comenaminic acid-trisodium salt having the formula:

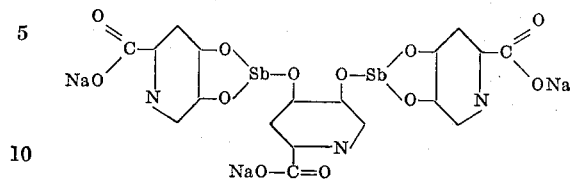

Example 8

A solution of 0.06 mol of antimony trifluoride in 50 ml. of water is added to a solution of 0.06 mol of sorbitan in 50 ml. of water. It is allowed to stand for 48 hours, filtered and the filtrate concentrated until precipitation starts. It is allowed to stand for 24 hours and then filtered. The fluorine-free white solid thus obtained contains approximately 50.4% antimony which corresponds to bis-(bi-antimonyl-sorbitan)-sorbitan.

It will be noted that most of the products described are asymetrical, and of these compounds the asymetrical ones have proved probably most useful.

Having thus described certain embodiments of the invention, we claim:

Antimonyl-catechol-salicylic acid-sodium salt, a white solid soluble in water, having therapeutic value and of the formula:

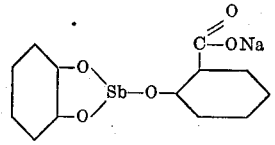

HAROLD P. BROWN.
JAMES A. AUSTIN.